United States Patent
Kumano

(10) Patent No.: US 10,289,887 B2
(45) Date of Patent: May 14, 2019

(54) ELECTRONIC APPARATUS, OPERATING METHOD OF ELECTRONIC APPARATUS, AND RECORDING MEDIUM

(71) Applicant: KYOCERA CORPORATION, Kyoto (JP)

(72) Inventor: Toshiyuki Kumano, Higashiosaka (JP)

(73) Assignee: KYOCERA CORPORATION, Kyoto (JP)

( * ) Notice: Subject to any disclaimer, the term of this patent is extended or adjusted under 35 U.S.C. 154(b) by 104 days.

(21) Appl. No.: 15/273,485

(22) Filed: Sep. 22, 2016

(65) Prior Publication Data

US 2017/0091512 A1 Mar. 30, 2017

(30) Foreign Application Priority Data

Sep. 28, 2015 (JP) .................. 2015-189593

(51) Int. Cl.
*G06K 9/00* (2006.01)
*G06F 3/01* (2006.01)
(Continued)

(52) U.S. Cl.
CPC ............ *G06K 9/0002* (2013.01); *G06F 3/011* (2013.01); *G06F 3/0346* (2013.01); *G06F 3/044* (2013.01);
(Continued)

(58) Field of Classification Search
CPC ............. G06K 9/0002; G06K 9/00087; G06K 9/00013; G06K 9/3233; G06F 3/0346;
(Continued)

(56) References Cited

U.S. PATENT DOCUMENTS 7,366,497 B2 4/2008 Nagata
8,577,644 B1 * 11/2013 Ksondzyk ............ G06F 3/0414
345/173
(Continued)

FOREIGN PATENT DOCUMENTS

JP 2005-159656 6/2005
JP 2010-146048 7/2010
(Continued)

OTHER PUBLICATIONS

Official Action in Japanese Application No. 2015-189593, dated Nov. 29, 2016, with Statement of Relevance of Non-English References, in 5 pages.
(Continued)

*Primary Examiner* — Sheela C Chawan
(74) *Attorney, Agent, or Firm* — Duane Morris LLP

(57) ABSTRACT

A fingerprint sensor includes a detection area to be touched by a user with a finger. The fingerprint sensor has a detection mode including a first detection mode in which the fingerprint sensor does not detect a fingerprint of the finger that is in contact with the detection area and a second detection mode in which the fingerprint sensor detects the fingerprint. At least one processor is configured to set the detection mode to the second detection mode when a predetermined condition is failed to be met while a display mode is set to a first display mode in which a display displays no information. Also, the at least one processor is configured to set the detection mode to the first detection mode when the predetermined condition is met while the display mode is set to the first display mode.

9 Claims, 10 Drawing Sheets

(51) Int. Cl.
*G06F 3/0346* (2013.01)
*G06F 3/044* (2006.01)
*G09G 5/00* (2006.01)
*H04L 29/06* (2006.01)
*H04W 12/06* (2009.01)
*G06K 9/32* (2006.01)
*H04W 88/02* (2009.01)

(52) U.S. Cl.
CPC ......... *G06K 9/00087* (2013.01); *G09G 5/003* (2013.01); *H04L 63/0861* (2013.01); *H04W 12/06* (2013.01); *G06F 2203/04106* (2013.01); *G06K 9/00013* (2013.01); *G06K 9/3233* (2013.01); *G09G 2330/021* (2013.01); *G09G 2330/022* (2013.01); *G09G 2358/00* (2013.01); *H04W 88/02* (2013.01); *Y02D 70/00* (2018.01); *Y02D 70/26* (2018.01)

(58) Field of Classification Search
CPC ............... G06F 3/011; G06F 3/044; G06F 2203/04106; G09G 2330/022; G09G 2358/00; G09G 2330/021; Y02D 70/00; Y02D 70/26; H04W 88/02; H04W 12/06
USPC ......... 382/100, 115, 124; 340/5.2, 5.8, 5.52, 340/5.53, 5.81, 5.82, 5.83; 345/156, 173, 345/175, 157
See application file for complete search history.

(56) References Cited

U.S. PATENT DOCUMENTS

| | | | |
|---|---|---|---|
| 8,782,775 B2 | 7/2014 | Fadell | |
| 8,902,182 B2* | 12/2014 | Rydenhag | G06F 3/04886 345/173 |
| 8,943,580 B2 | 1/2015 | Fadell | |
| 9,633,248 B2* | 4/2017 | Kim | G06K 9/00073 |
| 2006/0181521 A1* | 8/2006 | Perreault | G06F 1/1613 345/173 |
| 2009/0080717 A1* | 3/2009 | Dias | G06K 9/00013 382/124 |
| 2010/0153752 A1 | 6/2010 | Tsukamoto | |
| 2011/0032206 A1* | 2/2011 | Kitamura | G06F 1/169 345/173 |
| 2012/0071149 A1 | 3/2012 | Bandyopadhyay et al. | |
| 2012/0127179 A1* | 5/2012 | Aspelin | G06F 21/32 345/441 |
| 2014/0215496 A1* | 7/2014 | Sexton | H04M 1/725 719/318 |
| 2015/0070301 A1 | 3/2015 | Chia et al. | |
| 2016/0078268 A1* | 3/2016 | Mankowski | G06F 21/32 382/124 |

FOREIGN PATENT DOCUMENTS

| | | |
|---|---|---|
| JP | 2013-232197 | 11/2013 |
| JP | 2015-153231 A | 8/2015 |

OTHER PUBLICATIONS

Official Action dated Oct. 24, 2017 in counterpart Japanese Patent Application No. 2017-150571, with Statement of Relevance of Non-English References.
Official Action dated Feb. 21, 2017 in counterpart Japanese Patent Application No. 2017-008461.
Sato, T. "iPhone no Shimon ninsho no Settei to Rokku Kaijo", [online], Oct. 19, 2014, [searched on Feb. 10, 2017], Internet, https://www.youtube.com/watch?v=1BZA7cd-CM8.
Inoue, S., "Rokku Kaijo ga Yori Kaiteki ni—"Xperia Z5" Series no Shimon Ninsho Kinou o Tamesu", [online], ITmedia Inc., Sep. 6, 2015, [searched Feb. 10, 2017], Internet, http://www.itmedia.co.jp/mobile/aticles/1509/06/news014.html.

* cited by examiner

F I G. 3
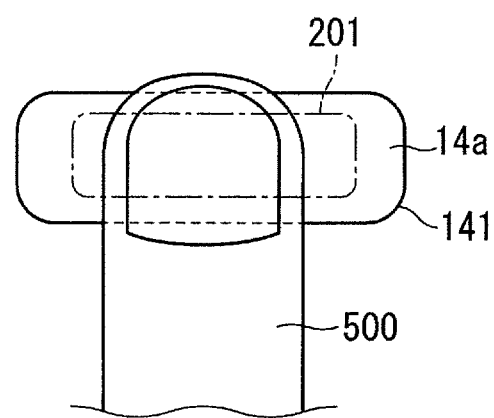

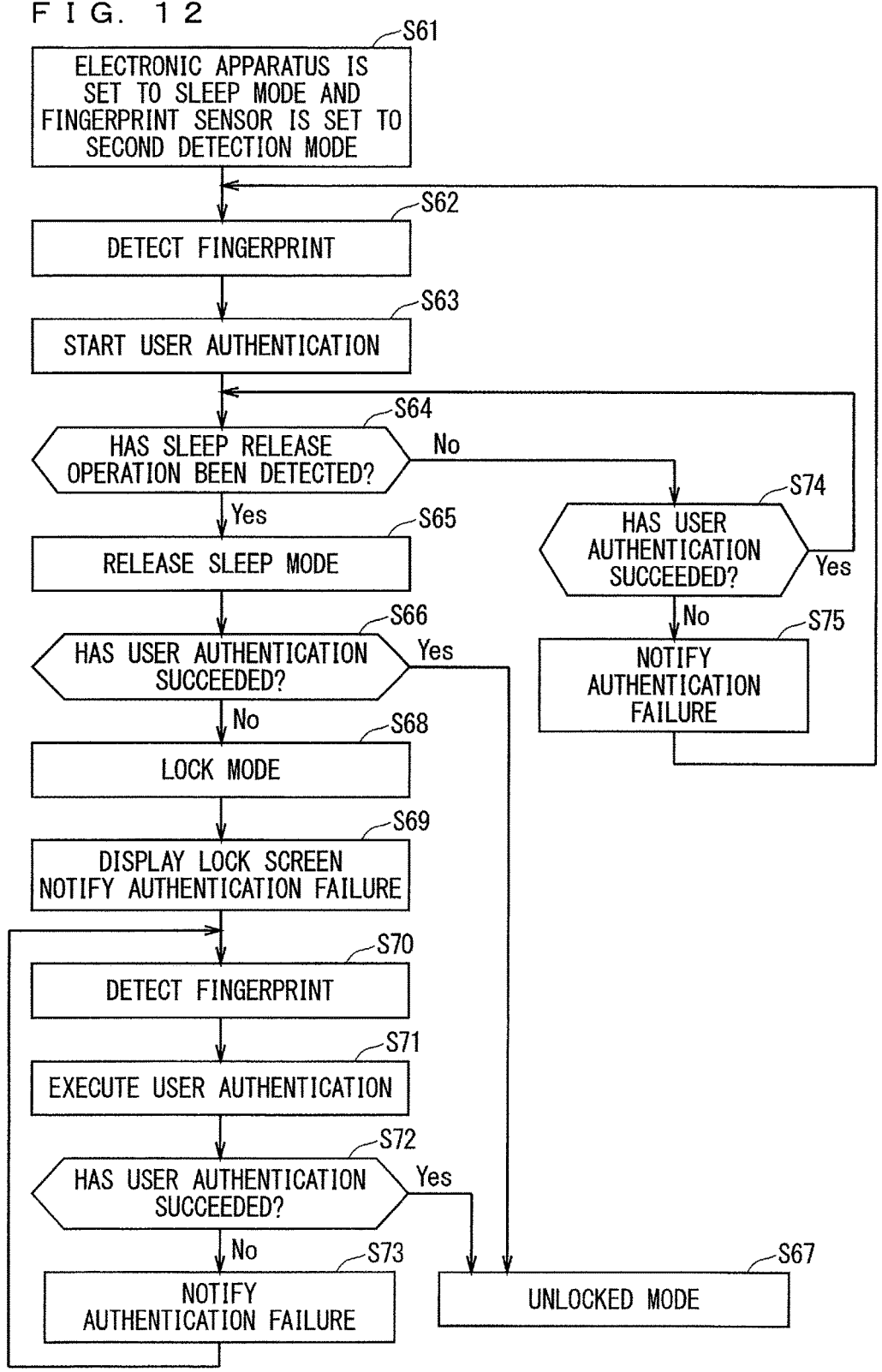

ELECTRONIC APPARATUS, OPERATING METHOD OF ELECTRONIC APPARATUS, AND RECORDING MEDIUM

CROSS-REFERENCE TO RELATED APPLICATION

The present application claims priority under 35 U.S.C. § 119 to Japanese Patent Application No. 2015-189593, filed on Sep. 28, 2015, entitled "ELECTRONIC APPARATUS AND OPERATING METHOD OF ELECTRONIC APPARATUS". The content of which is incorporated by reference herein in its entirety.

FIELD

Embodiments of the present disclosure relate generally to electronic apparatuses.

BACKGROUND

Various techniques concerning electronic apparatuses have been proposed.

SUMMARY

An electronic apparatus, an operating method of an electronic apparatus, and a non-transitory computer readable recording medium are disclosed. In one embodiment, an electronic apparatus comprises a display, a fingerprint sensor, and at least one processor. The display has a display mode including a first display mode in which the display displays no information and a second display mode in which the display displays information. The fingerprint sensor includes a detection area to be touched by a user with a finger. The fingerprint sensor has a detection mode including a first detection mode in which the fingerprint sensor does not detect a fingerprint of the finger that is in contact with the detection area and a second detection mode in which the fingerprint sensor detects the fingerprint. The at least one processor is configured to set the detection mode to the second detection mode when a predetermined condition is failed to be met while the display mode is set to the first display mode. Also, the at least one processor is configured to set the detection mode to the first detection mode when the predetermined condition is met while the display mode is set to the first display mode.

In one embodiment, an operating method of an electronic apparatus is a method for use in an electronic apparatus which includes a display and a fingerprint sensor. The fingerprint sensor includes a detection area to be touched by a user with a finger. The fingerprint sensor has a detection mode including a first detection mode in which the fingerprint sensor does not detect a fingerprint of the finger that is in contact with the detection area and a second detection mode in which the fingerprint sensor detects the fingerprint. The operating method comprises setting the detection mode of the fingerprint sensor to the second detection mode when a predetermined condition is failed to be met while the display displays no information. The detection mode is set to the first detection mode when the predetermined condition is met while the display displays no information.

In one embodiment, a non-transitory computer readable recording medium is a recording medium that stores a control program for controlling an electronic apparatus which includes a display and a fingerprint sensor. The fingerprint sensor includes a detection area to be touched by a user with a finger. The fingerprint sensor has a detection mode including a first detection mode in which the fingerprint sensor does not detect a fingerprint of the finger that is in contact with the detection area and a second detection mode in which the fingerprint sensor detects the fingerprint. The control program causes the electronic apparatus to set the detection mode of the fingerprint sensor to the second detection mode when a predetermined condition is failed to be met while the display displays no information. Also, the control program causes the electronic apparatus to set the detection mode to the first detection mode when a predetermined condition is met while the display displays no information.

BRIEF DESCRIPTION OF THE DRAWINGS

FIG. 3 illustrates a fingerprint detection area.

FIG. 12 illustrates a flowchart showing an example of the operation of the electronic apparatus.

DETAILED DESCRIPTION

<External Appearance of Electronic Apparatus>

Figure 1:
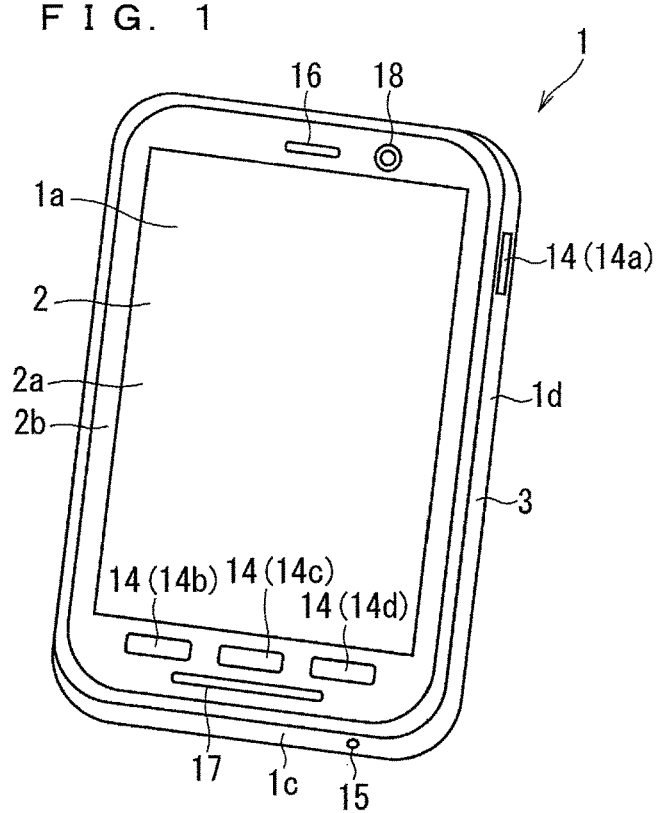
FIG. 1 illustrates a schematic perspective view of an example of an external appearance of an electronic apparatus.
Figure 2:
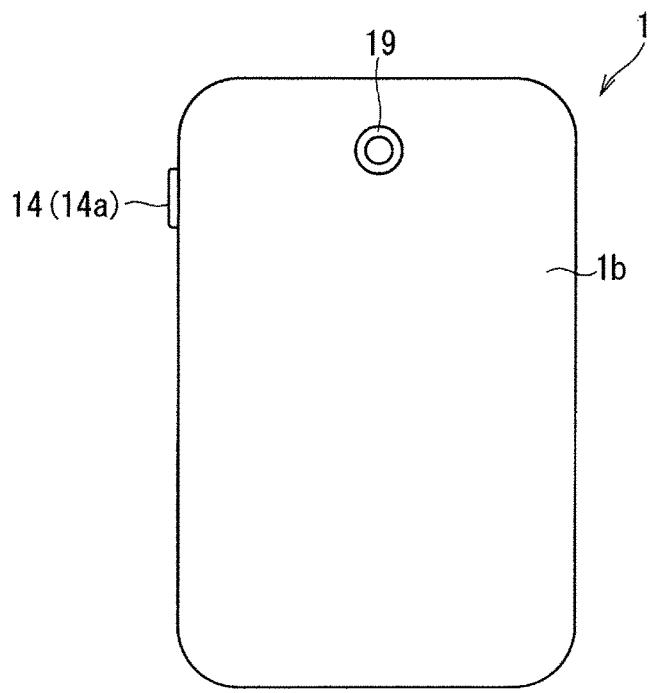
FIG. 2 illustrates a schematic rear view of the example of the external appearance of the electronic apparatus.

FIG. 1 illustrates a schematic perspective view of an example of an external appearance of an electronic apparatus 1. FIG. 2 illustrates a schematic rear view of the example of the external appearance of the electronic apparatus 1. The electronic apparatus 1 is, for example, a mobile phone such as a smartphone. The electronic apparatus 1 can communicate with another communication apparatus via, for example, a base station and a server.

As illustrated in FIGS. 1 and 2, the electronic apparatus 1 includes a cover panel 2 located on a front surface 1a thereof and an apparatus case 3 to which the cover panel 2 is fitted. The cover panel 2 and the apparatus case 3 form the exterior of the electronic apparatus 1. The electronic apparatus 1 has, for example an approximately rectangular plate shape in a plan view.

The cover panel 2 includes a display area (display screen) 2a on which a variety of information such as characters, signs, and graphics is displayed by a display panel 121, which will be described below. The major part of a peripheral portion 2b of the cover panel 2 that surrounds the display area 2a is opaque and/or not transparent because of, for example, a film or the like attached thereto. Thus, the major part of the peripheral portion 2b of the cover panel 2 is a non-display area in which the variety of information displayed by the display panel 121 does not appear.

On the rear side of the display area 2a is provided a touch sensor 130, which will be described below. The user can thus provide various instructions to the electronic apparatus 1 by performing operations on the display area 2a with an operator such as a finger.

As illustrated in FIG. 1, in the upper edge portion of the cover panel 2, a receiver hole 16 is provided. Also, a front lens transparent part 18, through which the lens of a front imaging unit 180 is visually recognized form the outside of the electronic apparatus 1, is provided in the upper edge portion of the cover panel 2. The front imaging unit 180 will be described below. In the lower edge portion of the cover panel 2, a speaker hole 17 is provided. In a bottom surface 1c of the electronic apparatus 1, that is, in the bottom surface (lower side surface) of the apparatus case 3, a microphone hole 15 is provided.

As illustrated in FIG. 2, in a rear surface 1b of the electronic apparatus 1, that is, in the upper edge portion of the rear surface of the apparatus case 3 is provided a rear lens transparent part 19, through which the imaging lens of a rear imaging unit 190 is visually recognized form the outside of the electronic apparatus 1. The rear imaging unit 190 will be described below.

The apparatus case 3 accommodates a plurality of operation buttons 14. The individual operation buttons 14 are hardware buttons. Specifically, the individual operation buttons 14 are push buttons. The operation buttons are also called "operation keys" or "keys". The operation buttons 14 each include an operation area which is to be touched by a user performing an operation on the relevant operation button 14. The operation area of the individual operation button 14 is exposed at the front surface of the electronic apparatus 1. The user can press the individual operation button 14 by pressing the operation area of the relevant operation button 14.

The individual operation buttons 14 have functions assigned thereto. At the press of the individual operation button 14, it is placed in the on state, and then, the electronic apparatus 1 can perform the function assigned to the operation button 14 placed in the on state. The plurality of operation buttons 14 include operation buttons 14a to 14d. The plurality of operation buttons 14 may be hereinafter collectively referred to as an "operation button group 140". Performing an operation on the operation button 14 means pressing the operation button 14 to place it in the on state.

The operation button 14a is, for example, a power button. The power button is an operation button for suspending part of the functions of the electronic apparatus 1 or restoring (restarting) the suspended function thereof. As illustrated in FIGS. 1 and 2, the operation button 14a is located in a right side surface 1d of the electronic apparatus 1, that is, in the right side surface of the apparatus case 3. The user can perform operations on the operation button 14a to suspend part of the functions the electronic apparatus 1 or to restore the suspended function thereof. The operation key 14a is hereinafter also referred to as a "power button 14a".

The power button 14a includes a fingerprint detection area 201 of a fingerprint sensor 200. The finger print sensor 200 will be described below. Specifically, part of the operation area of the power button 14a is the fingerprint detection area 201 of the fingerprint sensor 200. FIG. 3 illustrates an example of the fingerprint detection area 201. The fingerprint sensor 200 can detect the fingerprint of a finger 500 of the user that is in contact with the fingerprint detection area 201 included in an operation area 141 of the power button 14a.

The fingerprint detection area 201 may coincide with the operation area 141. The example of FIG. 3 should not be construed as limiting the shape of the operation area 141 and the shape of the fingerprint detection area 201. The fingerprint detected by the fingerprint sensor 200 is hereinafter also referred to as a "detected fingerprint". Herein, touching the operation area 141 with a finger also means touching the fingerprint detection area 201 with the finger. At a press of the operation area 141 with a finger, the user can push down the power button 14a and/or cause the fingerprint sensor 200 to detect the fingerprint of the finger.

The operation button 14b is, for example, a back button. The back button is an operation button for replacing the image in the display area 2a with the immediately preceding image. As illustrated in FIG. 1, the operation button 14b is located in the lower edge portion of the front surface of the electronic apparatus 1. The user can perform an operation on the operation button 14b to replace the image in the display area 2a with the immediately preceding image.

The operation button 14c is, for example, a home button. The home button is an operation button for causing a home screen, which will be described below, to be displayed in the display area 2a. As illustrated in FIG. 1, the operation button 14c is located in the lower edge portion of the front surface of the electronic apparatus 1. The user can perform an operation on the operation button 14c to cause the home screen to be displayed in the display area 2a. The operation button 14c is hereinafter also referred to as a "home button 14c".

The operation button 14d is, for example, a history button. The history button is an operation button for causing execution histories of applications in the electronic apparatus 1 to be displayed in the display area 2a. As illustrated in FIG. 1, the operation button 14d is located in the lower edge portion of the cover panel 2. The user can perform an operation on the operation button 14d to cause execution histories of applications in the electronic apparatus 1 to be displayed in the display area 2a.

The examples of FIGS. 1 and 2 should not be construed as limiting the shapes and the positions of the individual operation buttons 14.

<Electrical Configuration of Electronic Apparatus>

Figure 4:
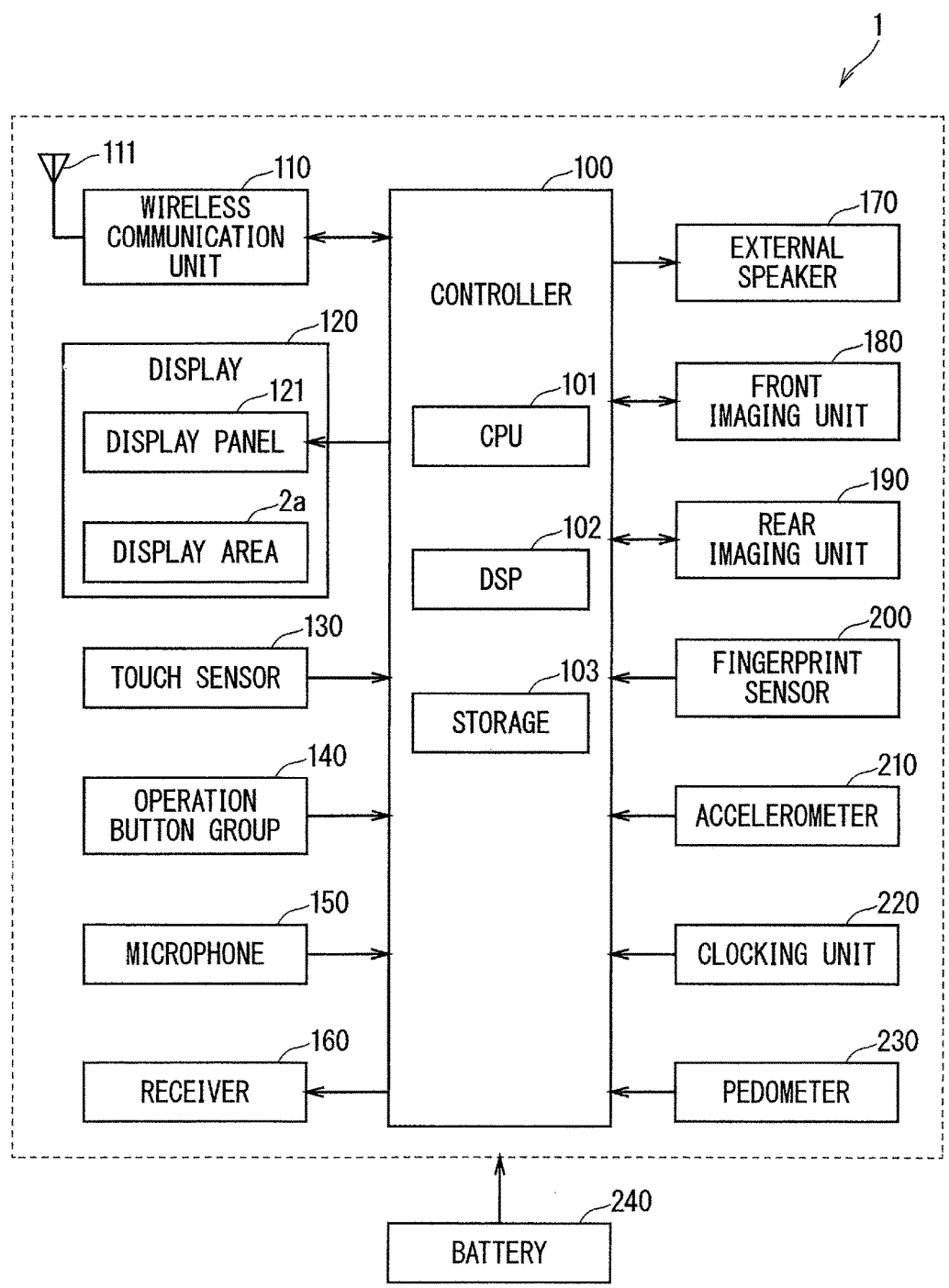
FIG. 4 illustrates an example of the electrical configuration of the electronic apparatus.

FIG. 4 illustrates a block diagram showing an example of the electrical configuration of the electronic apparatus 1. As illustrated in FIG. 4, the electronic apparatus 1 includes a controller 100, a wireless communication unit 110, a display 120, the touch sensor 130, the operation button group 140, a microphone 150, and a receiver 160. The electronic apparatus 1 also includes an external speaker 170, the front imaging unit 180, the rear imaging unit 190, the fingerprint sensor 200, an accelerometer 210, a clocking unit 220, a pedometer 230, and a battery 240. The individual constituent elements of the electronic apparatus 1 are accommodated in the apparatus case 3.

The controller 100 can manage the overall operation of the electronic apparatus 1 by controlling other constituent elements of the electronic apparatus 1. The controller 100 includes at least one processor for providing control and processing capability to perform various functions as described in further detail below. In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

Here, the controller 100 includes, for example, a CPU (central processing unit) 101, a DSP (digital signal processor) 102, and a storage 103.

The storage 103 is formed of a non-transitory recording medium that can be read by the CPU 101 and the DSP 102, such as a ROM (Read Only Memory) and a RAM (Random Access Memory). The storage 103 can store various programs for controlling the operation of the electronic apparatus 1, specifically, the operation of the individual constituent elements of the electronic apparatus 1 such as the wireless communication unit 110. The CPU 101 and the DSP 102 execute the various programs stored in the storage 103, so that the various functions of the controller 100 are performed.

The various programs in the storage 103 include a variety of application programs (hereinafter also simply referred to as "applications"). The storage 103 stores, for example, a voice call application for performing voice calls and video calls, an e-mail application for writing, reading, transmitting, and receiving e-mails, and a browser application for displaying webpages. The storage 103 also stores, for example, a camera application for capturing images of subjects using the front imaging unit 180 and the rear imaging unit 190, a game application for playing games such as a puzzle game on the electronic apparatus 1, and a music playback control application for controlling the playback of music data stored in the storage 103.

The storage 103 may include a non-transitory computer readable recording medium other than the ROM and the RAM. The storage 103 may include, for example, a compact hard disk drive and a SSD (solid state drive). Part or all of the functions of the controller 100 may be enabled by hardware that needs no software to perform the functions thereof.

The wireless communication unit 110 is equipped with an antenna 111. In the wireless communication unit 110, the antenna 111 can receive, via a base station, a signal transmitted from a mobile phone different from the electronic apparatus 1 or a signal transmitted from a communication device such as a web server connected to the Internet. The wireless communication unit 110 can perform amplification and down-conversion on the reception signal received by the antenna 111, and output the resultant signal to the controller 100. The controller 100 can perform demodulation and the like on the input reception signal to acquire information such as a sound signal indicating voice or music contained in the reception signal.

Further, the wireless communication unit 110 can perform up-conversion and amplification on a transmission signal generated by the controller 100, and wirelessly transmit the processed transmission signal from the antenna 111. The transmission signal from the antenna 111 is received, via the base station or the like, by a mobile phone different from the electronic apparatus 1 or a communication device such as a web server connected to the Internet.

The display 120 includes the display panel 121, the cover panel 2, and the like. The display panel 121 is, for example, a liquid crystal panel or an organic electroluminescent (EL) panel. The display panel 121 is controlled by the controller 100, so that the display panel 121 can display a variety of information such as characters, signs, and graphics. The display panel 121 displays the variety of information in the display area 2a of the cover panel 2.

The touch sensor 130 can detect an operation performed on the display area 2a with an operator such as a finger. When the user performs an operation on the display area 2a with an operator such as a finger, the touch sensor 130 inputs an electrical signal corresponding to the operation to the controller 100. The controller 100 can specify, based on the electrical signal input from the touch sensor 130, the purpose of the operation performed on the display area 2a, and perform processing appropriate to the purpose.

The touch sensor 130 is, for example, a projected capacitive touch panel. The touch panel is disposed separately from, for example, the display panel 121. In this case, the touch panel is fitted to the rear surface of the cover panel 2. The display panel 121 is fitted to a surface of the touch panel opposite to another surface facing the cover panel 2. This means that the display panel 121 is fitted to the rear surface of the cover panel 2 with the touch panel therebetween.

The touch sensor 130 is not limited to the touch panel disposed separately from the display panel 121, and may be a touch panel integral with the display panel 121 such as a so-called in-cell touch panel or a so-called on-cell touch panel. In this case, the display panel 121 including the touch sensor 130 is fitted to the rear surface of the cover panel 2.

Also, the user can provide various instructions to the electronic apparatus 1 by performing operations on the display area 2a with an operator other than fingers, that is, for example, with a pen for capacitive touch panels such as a stylus pen.

When receiving an operation of the user, the individual button 14 included in the operation button group 140 outputs, to the controller 100, an operation signal indicating that an operation is performed on the operation button 14. The controller 100 can thus determine, based on the operation signal from the individual operation button 14, whether an operation is performed on the operation button 14. The controller 100 can perform processing corresponding to the operation button 14 being the target of the operation.

The microphone 150 can convert a sound input from the outside of the electronic apparatus 1 into an electrical sound signal, and output the electrical sound signal to the controller 100. The sound from the outside of the electronic apparatus 1 is received by the microphone 150 through, for example, the microphone hole 15 in the bottom surface (lower side surface) of the apparatus case 3.

The external speaker 170 is, for example, a dynamic speaker. The external speaker 170 can convert an electrical sound signal from the controller 100 into a sound, and output the sound. The sound is output from the external speaker 170 to the outside of the electronic apparatus 1 through, for example, the speaker hole 17 in the lower edge portion of the cover panel 2. The sound output through the speaker hole 17 is set to be a degree such that the sound can be heard at a location away from the electronic apparatus 1.

The receiver 160 is for example, a dynamic speaker. The receiver 160 can output a received sound. The receiver 160 can convert an electrical sound signal from the controller 100 into a sound, and output the sound. The sound is output from the receiver 160 to the outside through, for example, the receiver hole 16 in the upper edge portion of the cover panel 2. The volume of the sound output through the receiver hole 16 is set to be lower than the volume of the sound output from, for example, the external speaker 170 through the speaker hole 17.

In place of the receiver 160, a piezoelectric vibrating element may be disposed. The piezoelectric vibrating element can vibrate in accordance with a sound signal from the controller 100. The piezoelectric vibrating element is disposed on, for example, the rear surface of the cover panel 2. The vibrations of the piezoelectric vibrating element based on the sound signal can cause the cover panel 2 to vibrate. When the user moves the cover panel 2 close to an ear, the vibrations of the cover panel 2 are transmitted as voice to the user. The piezoelectric vibrating element provided in place of the receiver 160 eliminates the need for the receiver hole 16.

The front imaging unit 180 and the rear imaging unit 190 each include a lens, an image sensor, and the like. The front imaging unit 180 and the rear imaging unit 190 can individually capture an image of a subject in accordance with the control by the controller 100, create a still image or a moving image of the imaged subject, and output the resultant image to the controller 100.

The lens of the front imaging unit 180 can be visually recognized from the front lens transparent part 18 in the cover panel 2. The front imaging unit 180 can thus capture an image of the subject in front of the cover panel 2 of the electronic apparatus 1, that is, in front of the front surface 1a of the electronic apparatus 1. The lens of the rear imaging unit 190 can be visually recognized from the rear lens transparent part 19 in the rear surface 1b of the electronic apparatus 1. The rear imaging unit 190 can thus capture an image of the subject in front of the rear surface 1b of the electronic apparatus 1.

The fingerprint sensor 200 can detect the fingerprint of a finger that is in contact with the operation area 141 of the power button 14a. Specifically, the fingerprint detection area 201 of the fingerprint sensor 200 is included in the operation area 141, and thus, the fingerprint sensor 200 can detect the fingerprint of a finger that is in contact with the fingerprint detection area 201. The fingerprint sensor 200 outputs, as the fingerprint detection result, a fingerprint image showing the detected fingerprint to the controller 100. The fingerprint sensor 200 employs, for example, a capacitive sensing method. The fingerprint sensor 200 may employ a sensing method other than the capacitive sensing method, such as an optical method.

The accelerometer 210 can measure the acceleration. The accelerometer 210 can measure, for example, the acceleration in three directions that are perpendicular to each other. The accelerometer 210 can output acceleration information that indicates the measured acceleration to the controller 100. The controller 100 can thus specify the spatial movement of the electronic apparatus 1 based on the acceleration information output from the accelerometer.

The clocking unit 220 can obtain the current time and the current date. The clocking unit 220 includes, for example, a real time clock (RTC). The clocking unit 220 can output, to the controller 100, the time information indicating the obtained time and the date information indicating the obtained date.

The pedometer 230 can count the number of steps taken by the user. The pedometer 230 can specify the spatial movement of the electronic apparatus 1 based on, for example, the acceleration information output from the accelerometer 210. When the specified spatial movement of the electronic apparatus 1 agrees with a predetermined movement, the pedometer 230 can determine that the user holding the electronic apparatus 1 is walking, and can count the steps taken by the user.

The battery 240 can output power for the electronic apparatus 1. The battery 240 is, for example, a rechargeable battery such as a lithium-ion secondary battery. The battery 240 can supply power to various electronic components of the electronic apparatus 1, such as the controller 100 and the wireless communication unit 110.

<Operation Modes of Electronic Apparatus>

The electronic apparatus 1 has an operation mode including a sleep mode in which part of the functions of the electronic apparatus 1 is suspended and a normal mode in which the sleep mode is released. The functions of the electronic apparatus 1 to be suspended during the operation in the sleep mode include the display function of displaying a variety of information such as an image in the display area 2a. In the sleep mode, some of the constituents of the electronic apparatus 1 including the display panel 121 and the touch sensor 130 are placed inactive. The electronic apparatus 1 consumes a smaller amount of power in the sleep mode than in the normal mode. The controller 100 controls a predetermined constituent of the electronic apparatus 1 to perform the setting of the operation mode of the electronic apparatus 1.

If a certain period of time has elapsed with no operation being performed on the electronic apparatus 1 operating in the normal mode, the controller 100 switches the operation mode of the electronic apparatus 1 from the normal mode to the sleep mode. Also, in response to an operation on the power button 14a of the electronic apparatus 1 operating in the normal mode, the controller 100 switches the operation mode of the electronic apparatus 1 from the normal mode to the sleep mode.

In response to an operation performed on the power button 14a of the electronic apparatus 1 operating in the sleep mode, the controller 100 switches the operation mode of the electronic apparatus 1 form the sleep mode to the normal mode. This means that, in response to an operation on the power button 14a of the electronic apparatus 1 in the sleep mode, the function of the electronic apparatus 1 that has been suspended at the switch from the normal mode to the sleep mode is restored. Also, in response to an operation on the home button 14c of the electronic apparatus 1 in the sleep mode, the sleep mode is released, and the operation mode of the electronic apparatus 1 is switched from the sleep mode to the normal mode accordingly. While the operation mode of the electronic apparatus 1 is set to the sleep mode, the home button 14c functions as the operation button for releasing the sleep mode. The operation for releasing the sleep mode is hereinafter also referred to as a "sleep release operation".

<Screen Displayed on Display Screen>

The display 120 has a display mode including a first display mode and a second display mode. In the first display mode, the display panel 121 is inactive, where a variety of information such as characters, signs, and graphics is not displayed in the display area 2a. In the second display mode, the display panel 121 is active, where the variety of information such as characters, signs, and graphics is displayed in the display area 2a. When the operation mode of the electronic apparatus 1 is set to the sleep mode, the controller 100 sets the display mode of the display 120 to the first display mode. When the operation mode of the electronic apparatus 1 is set to the normal mode, the controller 100 sets the display mode of the display 120 to the second display mode.

Figure 5:
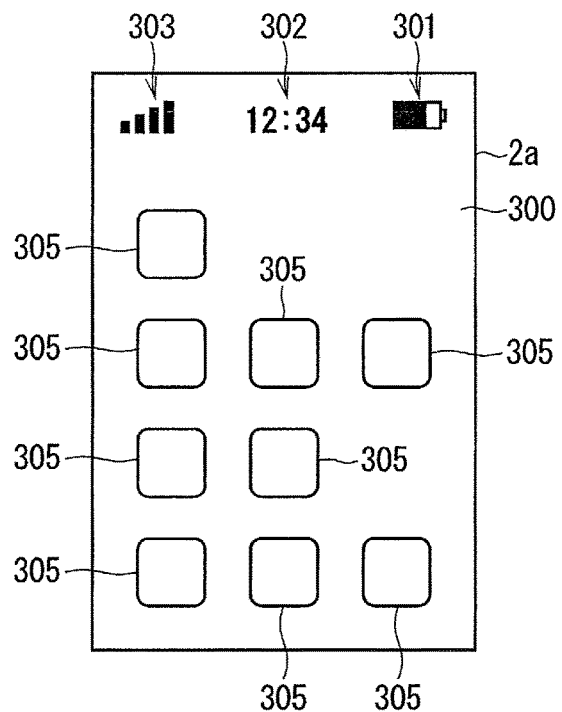
FIG. 5 illustrates an example of display contents displayed on a display screen.
Figure 6:
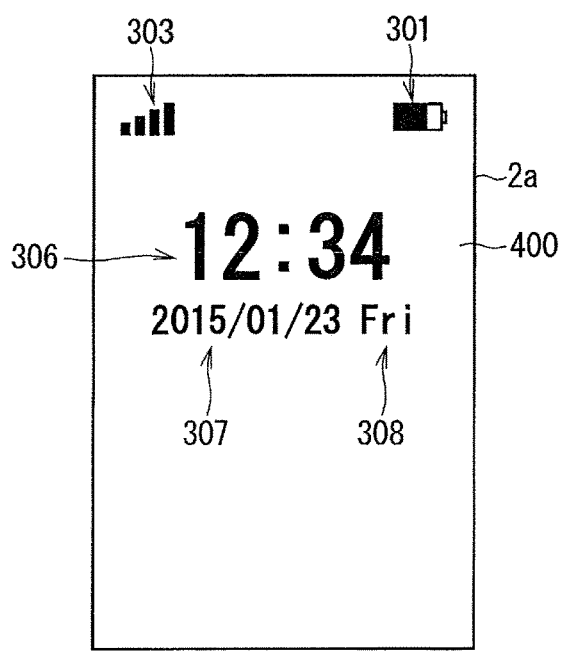
FIG. 6 illustrates an example of display contents displayed on a display screen.

While the operation mode of the electronic apparatus 1 is set to the normal mode, that is, while the display mode of the display 120 is set to the second display mode, various screens can be displayed in the display area 2a. While the display mode of the display 120 is set to the second display mode, the home screen, the lock screen, or the like is displayed in the display area 2a. FIG. 5 is an exemplary illustration of a home screen 300. FIG. 6 is an exemplary illustration of a lock screen 400.

As illustrated in FIG. 5, the home screen 300 shows a remaining battery life icon 301 indicating the current charge status of the battery 240, a current time 302 obtained by the clocking unit 220, a reception condition icon (also referred to as a radio wave condition icon) 303 indicating the radio wave reception condition of the wireless communication unit 110. The home screen 300 also shows graphics (hereinafter referred to as "application icons") 305 that are in a one-to-one correspondence with applications and are used to execute corresponding applications.

In the example of FIG. 5, nine application icons 305 are shown. In the example of FIG. 5, although the nine application icons 305 are denoted by the same reference number, these application icons 305 are in a one-to-one correspondence with the individual applications. When the user performs a predetermined operation on one of the application icons 305, the controller 100 reads, from the storage 103, the application corresponding to the application icon 305 being the target of the operation, and executes the application. Thus, by performing an operation on the individual application icon 305, the user can cause the electronic apparatus 1 to execute the application corresponding to the application icon 305 being the target of the operation. When the user performs an operation on the individual application icon 305 corresponding to the voice call application, the electronic apparatus 1 executes the voice call application. When the user performs an operation on the individual application icon 305 corresponding to the camera application, the electronic apparatus 1 executes the camera application. The application icons 305 can be regarded as software buttons displayed in the display area 2a.

Examples of operations of the user on the individual application icon 305 include an operation of bringing an operator, such as a finger, close to the application icon 305 and subsequently moving the operator away from the application icon 305. Another example of operations of the user on the individual application icon 305 is an operation of bringing an operator, such as a finger, into contact with the application icon 305 and subsequently moving the operator away from the application icon 305. These operations are so-called tap operations. Tap operations can be performed not only on the application icons 305 but also on a variety of information displayed in the display area 2a.

As illustrated in FIG. 6, similarly to the home screen 300, the lock screen 400 shows the remaining battery life icon 301 and the reception condition icon 303. The lock screen 400 also shows a current time 306, today's date 307, and today's day of week 308 that have been obtained by the clocking unit 220. For example, the lock screen 400 shows the current time 306 in a position different from the position of the current time 302 on the home screen 300 and in a size larger than the current time 302.

The normal mode of the electronic apparatus 1 includes a lock mode in which the user is inhibited from causing the electronic apparatus 1 to execute the applications in the storage 103 except for the specific applications (e.g., the voice call application and the camera application) or to execute any of the applications in the storage 103. While the operation mode of the electronic apparatus 1 is set to the lock mode, the user is inhibited from instructing the electronic apparatus 1 to execute the individual applications in the storage 103 except for the specific applications or to execute any of the individual applications in the storage 103. In some cases, part of functions of the application executed by the electronic apparatus 1 operating in the lock mode is restricted. For example, when the electronic apparatus 1 operating in the lock mode executes the voice call application, the outgoing voice call function except for dialing of specified phone numbers is restricted.

As described above, while the operation mode of the electronic apparatus 1 is set to the lock mode, at least part of the functions of the electronic apparatus 1 is restricted. The lock mode can be used to eliminate or reduce malfunctions caused by operations unintended by the user. The lock screen 400 is the screen for notifying that the operation mode of the electronic apparatus 1 is set to the lock mode. The lock screen 400 is displayed in the display area 2a while the operation mode of the electronic apparatus 1 is set to the lock mode.

When an operation is performed on the power button 14a of the electronic apparatus 1 operating in the sleep mode, the sleep mode is released. When an operation is performed on the home button 14c of the electronic apparatus 1 operating in the sleep mode, the sleep mode is released. When the sleep mode is released, the operation mode of the electronic apparatus 1 is switched to the lock mode, and the lock screen 400 is displayed in the display area 2a.

When an operation is performed on the home button 14c of the electronic apparatus 1 operating in the normal mode, not in the lock mode, the home screen 300 is displayed in the display area 2a.

With the lock screen 400 being displayed in the display area 2a, when the user performs a predetermined operation on the electronic apparatus 1, the electronic apparatus 1 is released from the lock mode, and the lock screen 400 displayed in the display area 2a is replaced with another screen such as the home screen 300. The state in which the lock mode is released during the operation in the normal mode is hereinafter referred to as an "unlocked mode".

<User Authentication>

The controller 100 can execute user authentication based on the fingerprint detection result obtained by the fingerprint sensor 200. The controller 100 functions as an authentication processor that can execute user authentication.

For example, the controller 100 executes user authentication while the operation mode of the electronic apparatus 1 is set to the lock mode. When determining that the user authentication has succeeded in the electronic apparatus 1 operating in the lock mode, the controller 100 switches the operation mode of the electronic apparatus 1 from the lock mode to the unlocked mode. That is to say, the lock mode is released. In the display area 2a, a display screen other than the lock screen 400 (e.g., the home screen 300 or a display screen displayed at the execution of an application) is displayed.

In executing user authentication, the controller 100 firstly extracts, from a fingerprint image output by the fingerprint sensor 200 as the fingerprint detection result, a feature point indicating the feature of the detected fingerprint shown in the fingerprint image. The feature point may include, for example, the positions of the endpoints and the branch points of a ridge line (projection) of the fingerprint and the thickness of the ridge line. Then, the controller 100 compares the extracted feature point with the reference feature point stored in the storage 103. The reference feature point is a feature point extracted from the fingerprint image showing the fingerprint of the authorized user (e.g., the owner of the electronic apparatus 1).

If the extracted feature point resembles the reference feature point on the basis of the comparisons made between them, the controller 100 determines that the user authentication has succeeded. In other words, the controller 100 determines that the user whose fingerprint has been detected by the fingerprint sensor 200 is the authorized user. If the extracted feature point does not resemble the reference feature point, the controller 100 determines that the user authentication has failed. In other words, the controller 100 determines that the user whose fingerprint has been detected by the fingerprint sensor 200 is an unauthorized user.

The normal mode of the electronic apparatus 1 includes a fingerprint registration mode for registering the user's fingerprint in the electronic apparatus 1. When a predetermined operation is performed on the display area 2a during the operation in the unlocked mode, the electronic apparatus 1 operates in the fingerprint registration mode. When the authorized user puts a finger of his/her hand on the fingerprint detection area 201 during the operation in the fingerprint registration mode, the fingerprint sensor 200 detects the fingerprint of the finger and outputs a fingerprint image showing the detected fingerprint. The controller 100 extracts a feature point from the fingerprint image output from the fingerprint sensor 200 and causes the storage 103 to store the extracted feature point as the reference feature point. This means that the reference feature point indicating the feature of the fingerprint of the authorized user is stored in the storage 103. In other words, the fingerprint of the authorized user is registered in the electronic apparatus 1.

<Detection Modes of Fingerprint Sensor>

The fingerprint sensor 200 has a first detection mode in which the fingerprint sensor 200 does not detect the fingerprint of a finger of the user that is in contact with the fingerprint detection area 201 and a second detection mode in which the fingerprint sensor 200 detect the fingerprint. The detection mode of the fingerprint sensor 200 is set by the controller 100. The fingerprint sensor 200 consumes a smaller amount of power in the first detection mode than in the second detection mode. User authentication is executed while the detection mode of the fingerprint sensor 200 is set to the second detection mode.

In order to reduce power consumption, the electronic apparatus 1 suspends, during the operation in the sleep mode, part of the functions including the display function of displaying a variety of information in the display area 2a. For example, while the operation mode of the electronic apparatus 1 is sets to the sleep mode, the controller 100 sets the detection mode of the fingerprint sensor 200 to the first detection mode in some cases.

In the case where the detection mode of the fingerprint sensor 200 is set to the first detection mode while the electronic apparatus 1 is operating in the sleep mode, the user is required to perform, before undergoing user authentication, an operation on, for example, the power button 14a to release the sleep mode such that the detection mode of the fingerprint sensor 200 is switched from the first detection mode to the second detection mode. The detection mode switching takes, for example, about one second. This could delay a start of user authentication.

With this in view, the electronic apparatus 1 may be configured in such a manner that the detection mode of the fingerprint sensor 200 is set to the second detection mode during the operation in the sleep mode. In this case, when a finger of the user comes into contact with the fingerprint detection area 201, the fingerprint of the relevant finger is detected, and thus, user authentication can be immediately started. This can eliminate the loss of time caused by the switching of the detection mode of the fingerprint sensor 200 from the first detection mode to the second detection mode, thus allowing a more immediate start of user authentication.

However, in the case where the detection mode of the fingerprint sensor 200 is set to the second detection mode during the operation in the sleep mode, the electronic apparatus 1 consumes a greater amount of power.

In one embodiment, meanwhile, in the case where the operation mode of the electronic apparatus 1 set to the sleep mode, when a predetermined condition is met, the detection mode of the fingerprint sensor 200 is set to the first detection mode. Conversely, when the predetermined condition is failed to be met, the detection mode of the fingerprint sensor 200 is set to the second detection mode. For example, when user authentication is less likely to be executed in the electronic apparatus 1 operating in the sleep mode, the detection mode of the fingerprint sensor 200 is set to the first detection mode. Otherwise, the detection mode of the fingerprint sensor 200 is set to the second detection mode. This configuration can reduce the amount of power consumed by the electronic apparatus 1 and allow a more immediate start of user authentication.

Figure 7:
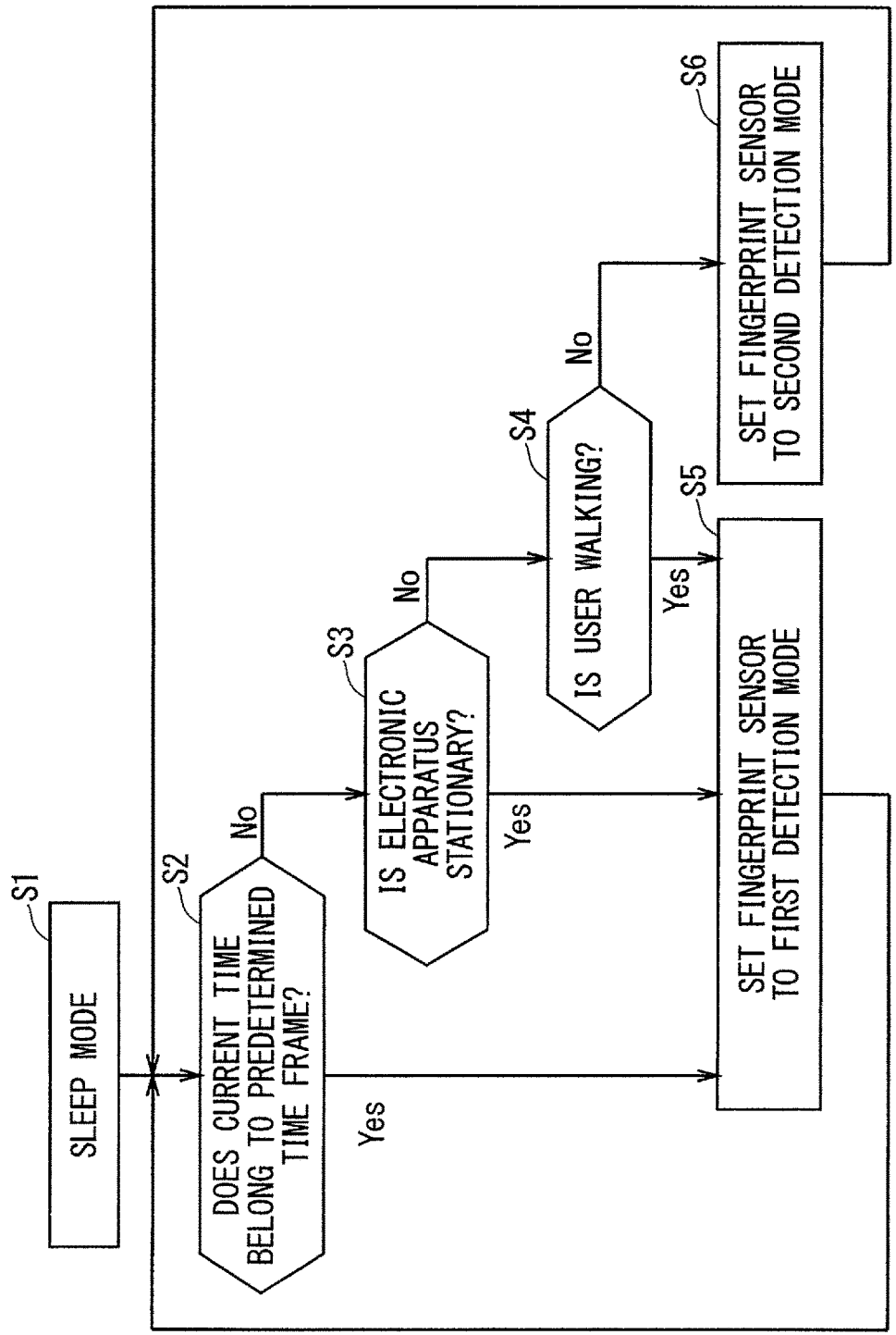
FIG. 7 illustrates a flowchart showing an example of the operation of the electronic apparatus.

The following will describe the operation of the controller 100 in setting the detection mode of the fingerprint sensor 200 while the operation mode of the electronic apparatus 1 is set to the sleep mode. FIG. 7 illustrates a flowchart showing an example of the operation.

With reference to FIG. 7, assume that, in Step S1, the electronic apparatus 1 operates in the sleep mode. In Step S2, the controller 100 makes a first determination whether the current time obtained by the clocking unit 220 belongs to a predetermined time frame. If it is determined, in Step S2, that the current time obtained by the clocking unit 220 belongs to the predetermined time frame, Step S5 is executed. In Step S5, the controller 100 sets the detection mode of the fingerprint sensor 200 to the first detection mode.

According to the daily life pattern of the user, the time frame in which the user does not use the electronic apparatus 1 is almost invariant in some cases. For example, the user is probably asleep and is not using the electronic apparatus 1 in the time frame from midnight to six o'clock am. If the electronic apparatus 1 is operating in the sleep mode during the above-mentioned time frame, the controller 100 sets the detection mode of the fingerprint sensor 200 to the first detection mode on the basis of the prediction that user authentication would be less likely to be executed. This configuration can reduce the amount of power consumed by the electronic apparatus 1.

The time frame over which the user is less likely to use the electronic apparatus 1 is input to the electronic apparatus 1 in response to an operation of the user, and then, is stored in the storage 103. For example, in response to each sleep release operation, the controller 100 may store, in the storage 103, the time at which the relevant operation is performed. Then, the controller 100 may predict, based on the stored time, a time frame in which user authentication would be less likely to be executed.

If it is determined, in Step S2, that the current time obtained by the clocking unit 220 does not belong to the predetermined time frame, Step S3 is executed. In Step S3, the controller 100 makes a second determination whether the electronic apparatus 1 is stationary. Specifically, when the acceleration measured by the accelerometer 210 remains to be smaller than or equal to a predetermined value for a predetermined period of time, the controller 100 determines that the electronic apparatus 1 is stationary. If the controller 100 determines, in Step S3, that the electronic apparatus 1 is stationary, in Step S5, the controller 100 sets the detection mode of the fingerprint sensor 200 to the first detection mode.

While the electronic apparatus 1 operating in the sleep mode is stationary, the user is probably not using the electronic apparatus 1. When the controller 100 determines that the electronic apparatus 1 operating in the sleep mode is stationary, the controller 100 sets the detection mode of the fingerprint sensor 200 to the first detection mode on the basis of the prediction that user authentication would be less likely to be executed. This configuration can reduce the amount of power consumed by the electronic apparatus 1.

If it is determined, in Step S3, that the electronic apparatus 1 is not stationary, Step S4 is executed. In Step S4, the controller 100 makes a third determination whether the user is walking. Specifically, when the pedometer 230 is counting the number of steps taken by the user, the controller 100 determines that the user is walking.

While walking, the user is probably not using the electronic apparatus 1. In the case where the operation mode of the electronic apparatus 1 is set to the sleep mode, when the controller 100 determines that the user is walking, the controller 100 sets the detection mode of the fingerprint sensor 200 to the first detection mode on the basis of the prediction that user authentication would be less likely to be executed. This configuration can reduce the amount of power consumed by the electronic apparatus 1.

It is not always required that the controller 100 determine whether the user is walking based on the measurement results obtained by the pedometer 230. The controller 100 may detect the spatial movement of the electronic apparatus 1 based on the acceleration measurement results obtained by the accelerometer 210. When determining that the detected movement agrees with the predetermined movement, the controller 100 may determine that the user is walking.

If it is determined, in Step S4, that the user is not walking, Step S6 is executed. In Step S6, the controller 100 sets the detection mode of the fingerprint sensor 200 to the second detection mode.

Subsequent to Step S5, Step S2 is executed. Also, subsequent to Step S6, Step S2 is executed. From that time forward, the electronic apparatus 1 operates similarly to the above.

As described above, in the case where the operation mode of the electronic apparatus 1 is set to the sleep mode, when the controller 100 makes negative determinations in Steps S2 to S4 of FIG. 7, that is, when it is not unlikely that user authentication will be executed, the controller 100 sets the detection mode of the fingerprint sensor to the second detection mode. In this configuration, the controller 100 can start user authentication when the fingerprint of a finger of the user that comes into contact with the fingerprint detection area 201 is detected.

Note that the order in which Steps S2 to S4 are executed is not limited to the order shown in FIG. 7. For the case that Step S2 is executed prior to Steps S3 and S4, when it is determined, in Step S2, that the current time obtained by the clocking unit 220 belongs to the predetermined time frame, the function of the accelerometer 210 and the function of the pedometer 230 may be suspended. This configuration can further reduce the amount of power consumed.

It is only required that at least one of Steps S2 to S4 be executed.

<Execution of User Authentication while Fingerprint Sensor is Operating in First Detection Mode>

Figure 8:
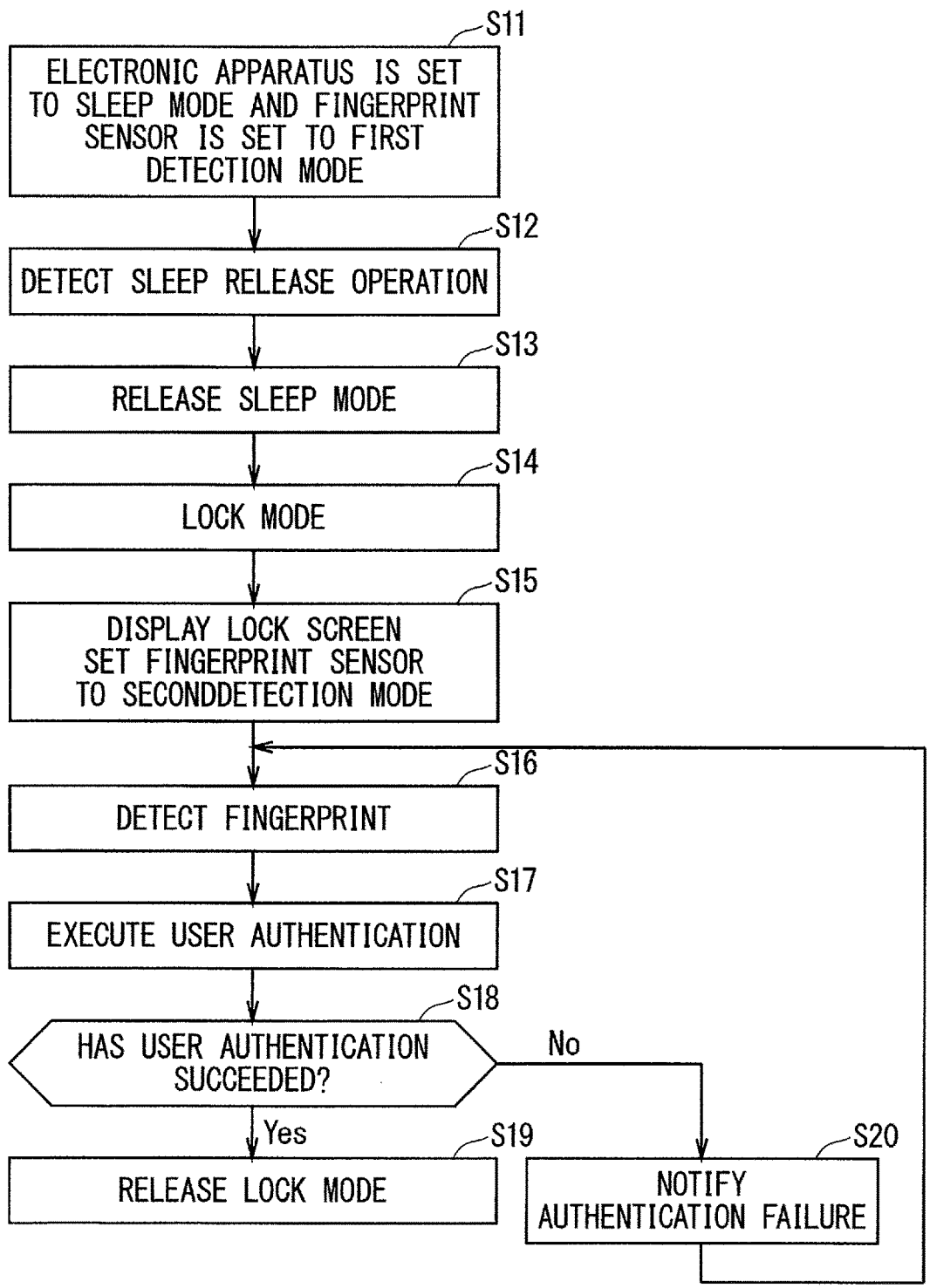
FIG. 8 illustrates a flowchart showing an example of the operation of the electronic apparatus.

The following will describe how the electronic apparatus 1 operates when the operation mode of the electronic apparatus 1 is set to the sleep mode and the detection mode of the fingerprint sensor 200 is set to the first detection mode. FIG. 8 illustrates a flowchart showing an example of the operation.

With reference to FIG. 8, assume that, in Step S11, the operation mode of the electronic apparatus 1 is set to the sleep mode and the detection mode of the fingerprint sensor 200 is set to the first detection mode. When the controller 100 detects, in Step S12, a sleep release operation such as an operation on the power button 14a, in Step S13, the controller 100 releases the sleep mode.

When the sleep mode is released, in Step S14, the controller 100 sets the operation mode of the electronic apparatus 1 to the lock mode. Then, in Step S15, the display 120 displays the lock screen in the display area 2a. In Step S15, the controller 100 switches the detection mode of the fingerprint sensor 200 from the first detection mode to the second detection mode.

When the detection mode of the fingerprint sensor 200 is switched to the second detection mode, the controller 100 enters the fingerprint detection wait state. When the fingerprint sensor 200 detects, in Step S16, the fingerprint of a fingerprint of the user that is in contact with the fingerprint detection area 201, Step S17 is executed.

In Step S17, the controller 100 executes user authentication based on the fingerprint detected in Step S16. Upon completion of the user authentication processing of Step S17, in Step S18, the controller 100 determines whether the user authentication has succeeded.

If it is determined, in Step S18, that the user authentication has succeeded, Step S19 is executed. In Step S19, the controller 100 releases the lock mode. When the lock mode is released, the display 120 displays a screen other than the lock screen, such as the home screen.

Figure 9:
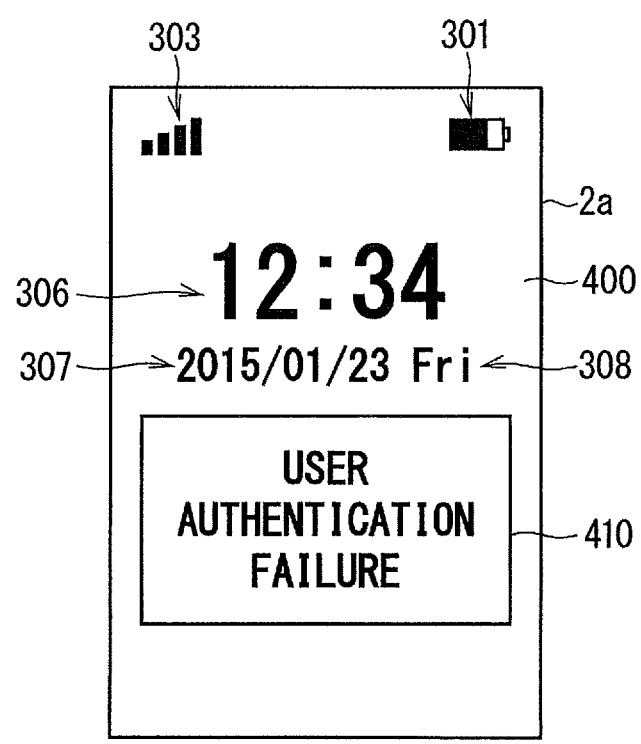
FIG. 9 illustrates an example of display contents displayed on the display screen.

Meanwhile, if it is determined, in Step S18, that the user authentication has failed, Step S20 is executed. In Step S20, the display 120 displays, on the lock screen, authentication failure notification information for notifying the user authentication failure. FIG. 9 is an exemplary illustration of the lock screen 400 including authentication failure notification information 410. In the example of FIG. 9, the string "User Authentication Failure" is displayed as the authentication failure notification information 410.

Subsequent to Step S20, the controller 100 enters the fingerprint detection wait state again, and Step S16 is executed. From that time forward, the electronic apparatus 1 operates similarly to the above.

As described above, in the case where the operation mode of the electronic apparatus 1 is set to the sleep mode and the detection mode of the fingerprint sensor 200 is set to the first detection mode, the user is required to perform a sleep release operation before undergoing user authentication such that the detection mode of the fingerprint sensor 200 is switched from the first detection mode to the second detection mode. Consequently, user authentication cannot be immediately started.

<Execution of User Authentication while Fingerprint Sensor Operates in Second Detection Mode>

Figure 10:
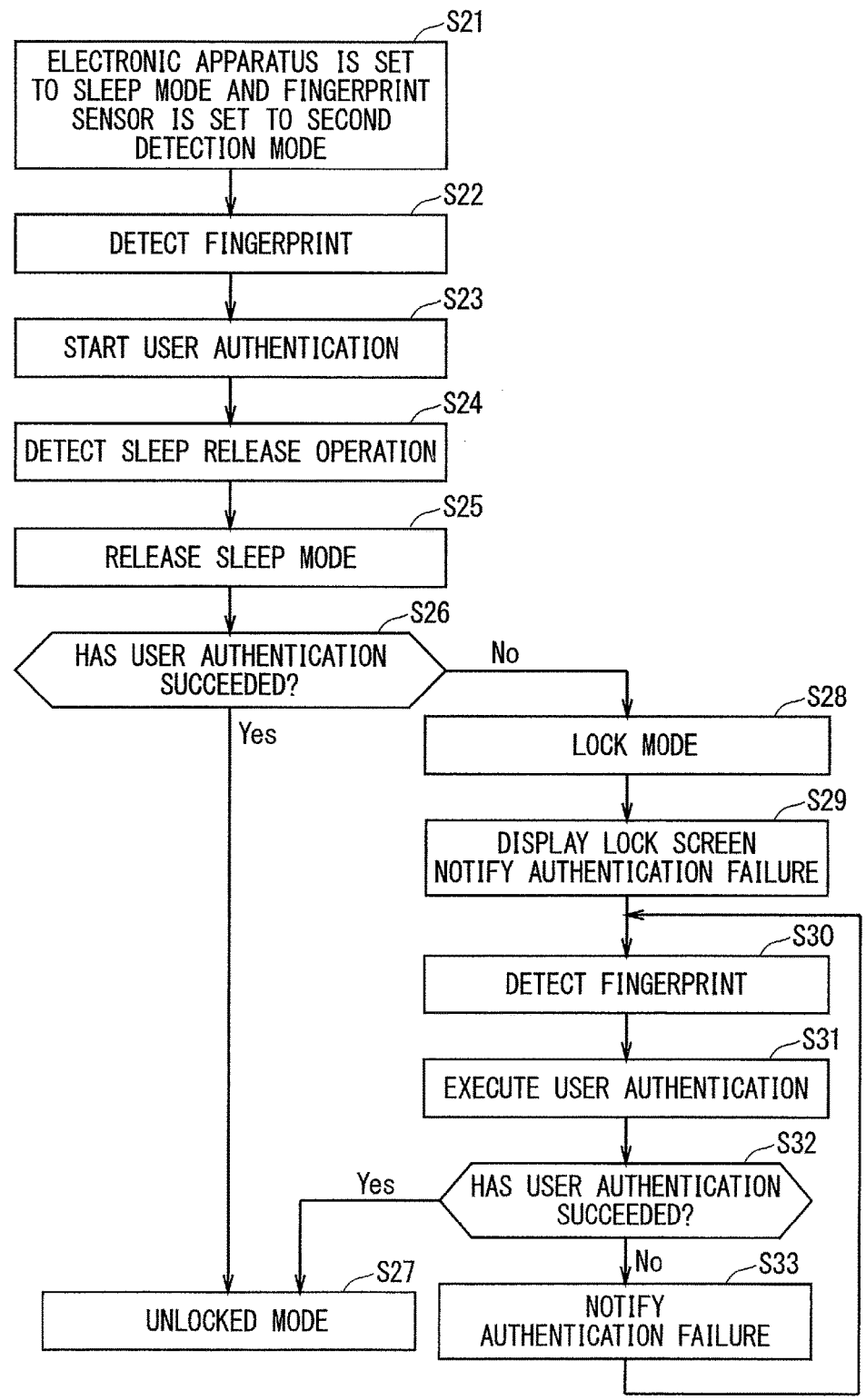
FIG. 10 illustrates a flowchart showing an example of the operation of the electronic apparatus.

The following will describe how the electronic apparatus 1 operates when the operation mode of the electronic apparatus 1 is set to the sleep mode and the detection mode of the fingerprint sensor 200 is set to the second detection mode. FIG. 10 illustrates a flowchart showing an example of the operation.

With reference to FIG. 10, assuming that, in Step S21, the operation mode of the electronic apparatus 1 is set to the sleep mode and the detection mode of the fingerprint sensor 200 is set to the second detection mode, the controller 100 is placed in the fingerprint detection wait state. In Step S22, when the user touches the operation area 141 with a finger to perform an operation on the power button 14a so as to release the sleep mode, the fingerprint sensor 200 detects the fingerprint of the finger.

When the fingerprint sensor 200 detects the fingerprint, in Step S23, the controller 100 starts user authentication based on the fingerprint detected in Step S22. With no operation being performed on the power button 14a, user authentication is started in response to the detection of the fingerprint of a finger of the user that comes into contact with the operation area 141. The result of the user authentication is stored in the storage 103.

When the controller 100 detects, in Step S24, a sleep release operation such as an operation performed on the power button 14a, in Step S25, the controller 100 releases the sleep mode.

Step S24 can be executed before the completion of the user authentication started in Step S23. In this case, the user authentication is continued while the processing of Steps S24 and S25 is performed.

Upon release of the sleep mode, in Step S26, the controller 100 determines, based on the result of the user authentication started in Step S23, whether the user authentication has succeeded.

If it is determined, in Step S26, that the user authentication has succeeded, Step S27 is executed. In Step S27, the controller 100 sets the operation mode of the electronic apparatus 1 to the unlocked mode. In the case where it is determined, in Step S26, that the user authentication has succeeded, the operation mode of the electronic apparatus 1 is switched from the sleep mode to the unlocked mode, without going into the lock mode. That is to say, the operation mode of the electronic apparatus 1 is switched from the sleep mode to the unlocked mode, without passing through the state in which the lock screen is displayed in the display area 2a.

Meanwhile, if the controller 100 determines, in Step S26, that the user authentication has failed, in Step S28, the controller 100 sets the operation mode of the electronic apparatus 1 to the lock mode.

When the operation mode of the electronic apparatus 1 is set to the lock mode, in Step S29, the display 120 displays a lock screen including authentication failure notification information for notifying the user authentication failure. For example, the display 120 displays the lock screen 400 including the authentication failure notification information 410 shown in FIG. 9.

Subsequent to Step S29, the controller 100 enters the fingerprint detection wait state again. When the fingerprint sensor 200 detects again, in Step S30, the fingerprint of a finger of the user that comes into contact with the fingerprint detection area 201, Step S31 is executed.

In Step S31, the controller 100 executes user authentication again based on the fingerprint detected in Step S30.

Upon completion of the user authentication in Step S31, in Step S32, the controller 100 determines whether the user authentication has succeeded.

If the controller 100 determines, in Step S32, that the user authentication has succeeded, in Step S27, the controller 100 switches the operation mode of the electronic apparatus 1 from the lock mode to the unlocked mode.

Meanwhile, if it is determined, in Step S32, that the user authentication has failed, in Step S33, the authentication failure notification information is displayed again.

Subsequent to Step S33, the controller 100 enters the fingerprint detection wait state again, and executes Step S30. From that time forward, the electronic apparatus 1 operates similarly to the above.

In the case where the operation mode of the electronic apparatus 1 is set to the sleep mode and the detection mode of the fingerprint sensor 200 is set to the second detection mode, when a finger of the user comes into contact with the fingerprint detection area 201, the fingerprint of the relevant finger is detected, and thus, user authentication can be started. Unlike the operation according to the flowchart of FIG. 8, this operation does not require the switching of the detection mode of the fingerprint sensor 200 from the first detection mode to the second detection mode, thus allowing a more immediate start of user authentication.

The user authentication can be continued during the period from the detection of the fingerprint by the fingerprint sensor 200 to the release of the sleep mode. Consequently, the result of the user authentication can be obtained more immediately after the release of the sleep mode.

The fingerprint detection area 201 of the fingerprint sensor 200 is included in the operation area 141 of the power button 14a that functions as the operation button for performing a sleep release operation. Thus, when the user touches the operation area 141 of the power button 14a with a finger so as to perform a sleep release operation, the fingerprint of the relevant finger can be detected. This allows for a more immediate start of user authentication.

Unless a sleep release operation is detected, the sleep mode is not released upon completion of the user authentication processing. Thus, the sleep mode is less likely to be released on the basis of the fingerprint detection operation that has been performed by the fingerprint sensor 200 in response to an inadvertent operation. Meanwhile, user authentication probably fails when the fingerprint detection operation is performed in response to an inadvertent operation. In this configuration, the authentication failure notification information is less likely to be displayed when such an inadvertent operation is performed.

<Modifications>

The following will describe various modifications.

<First Modification>

In the example above, the authentication failure notification information is displayed on the lock screen when user authentication has failed. It is not always required that the authentication failure notification information be displayed on the lock screen when the user authentication started in the electronic apparatus 1 in the sleep mode has failed.

Figure 11:
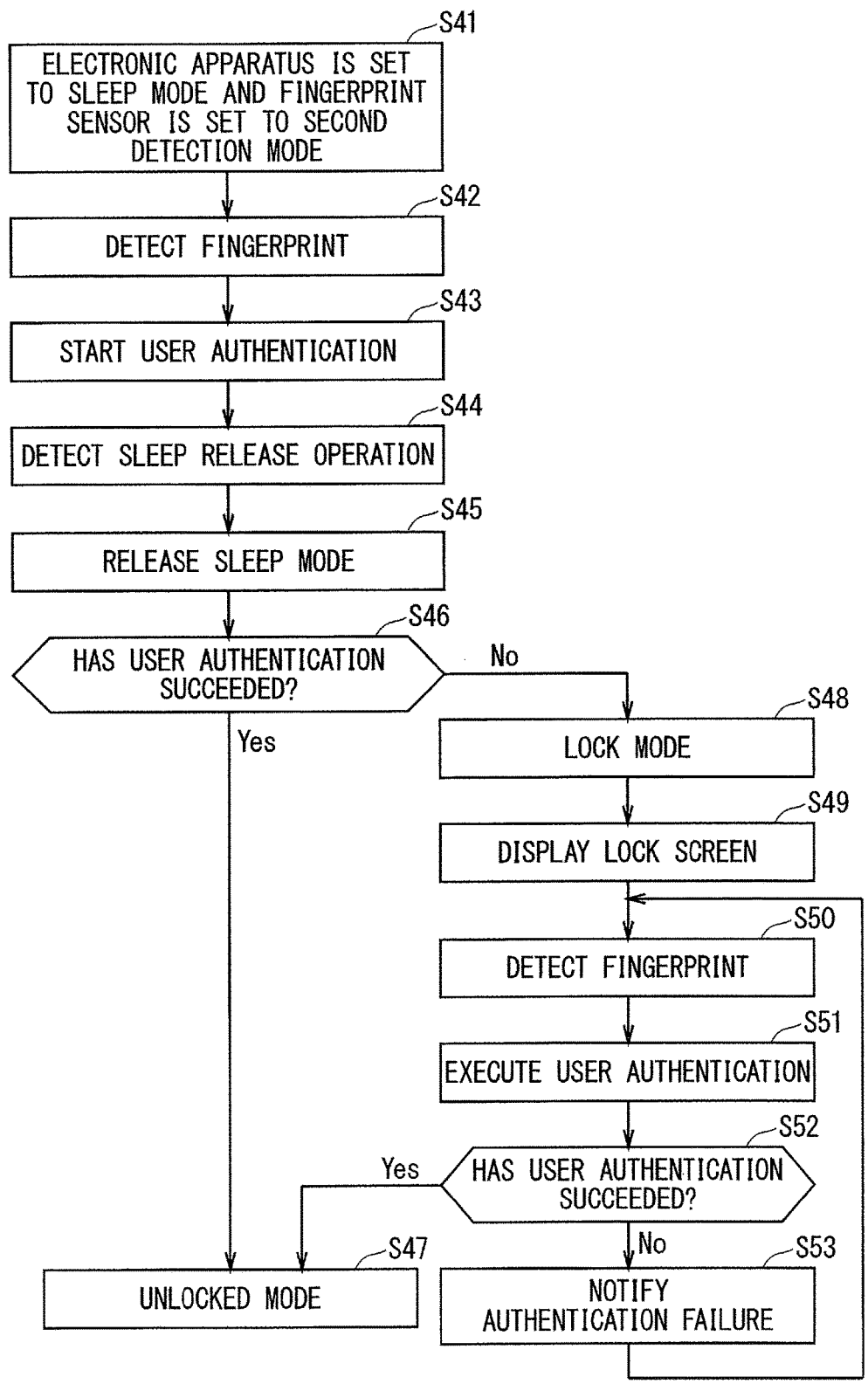
FIG. 11 illustrates a flowchart showing an example of the operation of the electronic apparatus.

FIG. 11 illustrates a flowchart showing an example of the operation of the electronic apparatus 1 according to one modification. FIG. 11 illustrates how the electronic apparatus 1 operates when the operation mode of the electronic apparatus 1 is set to the sleep mode and the detection mode of the fingerprint sensor 200 is set to the second detection mode.

The processing of Steps S41 to S48 is similar to the processing of Steps S21 to S28 of FIG. 10, and the description thereof will not be repeated.

If it is determined, in Step S46, that the user authentication has failed, Step S48 is executed. In Step S48, the controller 100 sets the operation mode of the electronic apparatus 1 to the lock mode.

When the operation mode of the electronic apparatus 1 is set to the lock mode, in Step S49, the display 120 displays a lock screen. The lock screen displayed in Step S49 does not include the authentication failure notification information. For example, the display 120 displays the lock screen 400 shown in FIG. 6.

Subsequent to Step S49, the controller 100 enters the fingerprint detection wait state again. When the fingerprint sensor 200 detects a fingerprint again in Step S50, Step S51 is executed.

In Step S51, the controller 100 executes user authentication again based on the fingerprint detected in Step S50. Upon completion of the user authentication in Step S51, in Step S52, the controller 100 determines whether the user authentication has succeeded.

If the controller 100 determines, in Step S52, that the user authentication has succeeded, in Step S47, the controller 100 releases the lock mode and sets the operation mode of the electronic apparatus 1 to the unlocked mode.

Meanwhile, if it is determined, in Step S52, that the user authentication has failed, Step S53 is executed. In Step S53, the display 120 displays the authentication failure notification information on the lock screen. For example, the display 120 displays the lock screen 400 including the authentication failure notification information 410 shown in FIG. 9. As described above, when the user authentication executed in the electronic apparatus 1 operating in the lock mode has failed, the authentication failure notification information is displayed on the lock screen.

After Step S53, the processing of Step S50 and subsequent steps is performed again.

As described above, when the user authentication started in the electronic apparatus 1 in the sleep mode has failed, the lock screen including no authentication failure information is displayed. Thus, the user can perform, with a finger whose fingerprint is not registered, an operation on the power button 14a such that the lock screen including no authentication failure information is displayed. When the user needs a lock screen merely to obtain time-of-day information or the like, the lock screen including no authentication failure notification information can be displayed. This configuration allows the user to readily check the lock screen.

<Second Modification>

In one modification, when user authentication has failed before the detection of a sleep release operation, the controller 100 notifies that the user authentication has failed. FIG. 12 illustrates a flowchart showing an example of the operation of the electronic apparatus 1 according to one modification. FIG. 12 illustrates how the electronic apparatus 1 operates when the operation mode of the electronic apparatus 1 is set to the sleep mode and the detection mode of the fingerprint sensor 200 is set to the second detection mode.

The processing of Steps S61 to S63 and the processing of Steps S65 to S73 are respectively similar to the processing of Steps S21 to S23 and the processing of Steps S25 to S33 of FIG. 10, and the detailed description thereof will be omitted.

When user authentication is started in Step S63, Step S64 is executed. In Step S64, the controller 100 determines whether a sleep release operation is detected. If it is determined, in Step S64, that a sleep release operation is detected, the processing of Step S65 and subsequent steps is performed.

Meanwhile, if it is determined, in Step S64, that no sleep release operation is detected, Step S74 is executed. In Step S74, the controller 100 determines, based on the result of the user authentication started in Step S63, whether the user authentication has succeeded.

If it is determined, in Step S74, that the user authentication has succeeded, Step S64 is executed again. The result of the user authentication in Step S74 is stored in the storage 103.

Meanwhile, if it is determined, in Step S74, that the user authentication has failed, Step S75 is executed. In Step S75, the controller 100 notifies that the user authentication has failed.

Unlike the user authentication failure notification information displayed in the display area 2a in the processing of Step S29 and the processing of Step S33 of FIG. 10, the user authentication failure notification in Step S75 is provided without using the display 120. For example, the user authentication failure is notified by a sound output from the external speaker. In a case where the electronic apparatus 1 is equipped with a notification lamp including an LED, the user authentication failure may be notified by light emitted from the notification lamp. In a case where the electronic apparatus 1 is equipped with a vibrator including a piezoelectric vibrating element, a motor, or the like, the user authentication failure may be notified by vibrations of the electronic apparatus 1 caused by the vibrator.

As described above, when the user authentication has failed before the detection of a sleep release operation, the user authentication failure is notified. The user can thus find the result of the user authentication before performing a sleep release operation.

Subsequent to Step S75, the controller 100 enters the fingerprint detection wait state again and executes Step S62. From that time forward, the electronic apparatus 1 operates similarly to the above.

When it is determined, in Step S74, that the user authentication has succeeded, and then, when the sleep mode is released, Step S67 may be executed without the need to determine again, in Step S66, whether the user authentication has succeeded.

The user authentication failure notification in Step S75 may be maintained until the user authentication succeeds. Alternatively, the user authentication failure notification in Step S75 may be terminated before the user authentication succeeds. For example, the user authentication failure notification in Step S75 may be terminated when the user authentication failure notification information is displayed in the display area 2a in Step S69, which is performed downstream of Step S75.

Also, the result of the user authentication performed prior to the sleep release operation may be notified when the user authentication succeeds.

<Third Modification>

In some embodiments above, the controller 100 sets the detection mode of the fingerprint sensor 200 to the first detection mode upon positive determinations in Steps S2 to S4 of FIG. 7. In other words, the controller 100 sets the detection mode of the fingerprint sensor 200 to the first detection mode on the basis of the prediction that user authentication would be less likely to be executed. Alternatively, the controller 100 may set the detection mode of the fingerprint sensor 200 to the second detection mode on the basis of the prediction that user authentication would be more likely to be performed, regardless of the determination results obtained in Steps S2 to S4 of FIG. 7.

In a case where the user does not take an incoming call during the reception of the call by the electronic apparatus 1 operating in the sleep mode, the user would probably undergo user authentication later on so as to find the incoming call history. In the case where the user does not take an incoming call during the reception of the call by the electronic apparatus 1 operating in the sleep mode, the controller 100 may set the detection mode of the fingerprint sensor 200 to the second detection mode and keep this state for a certain period of time, regardless of the determination results obtained in Steps S2 to S4 of FIG. 7.

In a case where the user does not open an e-mail in response to the reception of the e-mail by the electronic apparatus 1 operating in the sleep mode, the user would probably undergo user authentication later on so as to open the received e-mail. In the case where the user does not open an e-mail in response to the reception of the e-mail by the electronic apparatus 1 operating in the sleep mode, the controller 100 may set the detection mode of the fingerprint sensor 200 to the second detection mode and keep this state for a certain period of time, regardless of the determination results obtained in Steps S2 to S4 of FIG. 7.

As described above, the detection mode of the fingerprint sensor 200 is set to the second detection mode on the basis of the prediction that user authentication would be probably executed while the electronic apparatus 1 is operating in the sleep mode. This allows for a more immediate start of user authentication.

In some embodiments above, the fingerprint detection area 201 of the fingerprint sensor 200 is included in the operation area 141 of the power button 14a, Alternatively, the fingerprint detection area 201 of the fingerprint sensor 200 may be included in the operation area of an operation button other than the power button 14a. For example, the fingerprint detection area 201 of the fingerprint sensor 200 may be included in the operation area of the home button 14c that functions as the operation button for performing a sleep release operation. Also, the fingerprint detection area 201 of the fingerprint sensor 200 may be included in an operation button that does not function as the operation button for performing a sleep release operation or may be located in an area other than the operation area of the operation button, that is, in the surface of the apparatus case 3.

In some embodiments above, unless a sleep release operation is detected, the sleep mode is not released upon completion of the user authentication processing. Alternatively, the sleep mode may be released upon completion of the user authentication processing before a sleep release operation is detected. In this case, the user can release the sleep mode simply by touching the fingerprint detection area 201 of the fingerprint sensor 200 with a finger.

Although some embodiments are applied to mobile phones such as smartphones in the above description, the techniques of the present disclosure are also applicable to other electronic apparatuses including fingerprint sensors. The techniques of the present disclosure are applicable to, for example, electronic apparatuses such as personal computers, tablet terminals, and wearable electronic apparatuses designed to be fitted to an arm or the like.

While the electronic apparatus 1 has been described above in detail, the above description is in all aspects illustrative and not restrictive. Also, various modifications described above are applicable in combination as long as they are consistent with each other. It is understood that numerous modifications which have not been exemplified can be devised without departing from the scope of the present disclosure.

What is claimed is:

1. An electronic apparatus comprising:
   a display having a display mode including a first display mode in which the display displays no information and a second display mode in which the display displays information;
   a fingerprint sensor including a detection area to be touched by a user with a finger, the fingerprint sensor having a detection mode including a first detection mode in which the fingerprint sensor does not detect a fingerprint of the finger that is in contact with the detection area and a second detection mode in which the fingerprint sensor detects the fingerprint; and
   at least one processor configured to:
      set the detection mode to the second detection mode when a predetermined condition is failed to be met while the display mode is set to the first display mode, and
      set the detection mode to the first detection mode when the predetermined condition is met while the display mode is set to the first display mode, wherein the predetermined condition being met corresponds to a likelihood that the user is not currently using the electronic apparatus, wherein the predetermined condition includes a condition that a current time belongs to a predetermined time frame.

2. The electronic apparatus according to claim 1, further comprising an operation button for switching the display mode from the first display mode to the second display mode, wherein the detection area is included in the operation button.

3. The electronic apparatus according to claim 2, wherein the at least one processor executes user authentication based on a fingerprint detection result obtained by the fingerprint sensor.

4. The electronic apparatus according to claim 3, further comprising a notification unit configured to notify a user authentication result obtained by the at least one processor.

5. The electronic apparatus according to claim 4, wherein in a case where the user authentication executed by the at least one processor has failed in the first display mode, the notification unit notifies, at a switch of the display mode from the first display mode to the second display mode, that the user authentication has failed.

6. The electronic apparatus according to claim 2, further comprising an accelerometer configured to measure an acceleration, wherein
   the at least one processor determines, based on a measurement result obtained by the accelerometer, whether the electronic apparatus is stationary, and
   the predetermined condition includes a condition that the at least one processor determines that the electronic apparatus is stationary.

7. The electronic apparatus according to claim 2, wherein
   the at least one processor determines whether the user is walking, and
   the predetermined condition includes a condition that the at least one processor determines that the user is walking.

8. An operating method of an electronic apparatus, which includes a display and a fingerprint sensor including a detection area to be touched by a user with a finger, the fingerprint sensor having a detection mode including a first detection mode in which the fingerprint sensor does not detect a fingerprint of the finger that is in contact with the detection area and a second detection mode in which the fingerprint sensor detects the fingerprint, the operating method comprising:
setting the detection mode of the fingerprint sensor to the second detection mode when a predetermined condition is failed to be met while the display displays no information; and
setting the detection mode to the first detection mode when the predetermined condition is met while the display displays no information, wherein the predetermined condition being met corresponds to a likelihood that the user is not currently using the electronic apparatus, wherein the predetermined condition includes a condition that a current time belongs to a predetermined time frame.

9. A non-transitory computer readable recording medium that stores a control program for controlling an electronic apparatus, which includes a display and a fingerprint sensor including a detection area to be touched by a user with a finger, the fingerprint sensor having a detection mode including a first detection mode in which the fingerprint sensor does not detect a fingerprint of the finger that is in contact with the detection area and a second detection mode in which the fingerprint sensor detects the fingerprint, the control program causing the electronic apparatus to
set the detection mode of the fingerprint sensor to the second detection mode when a predetermined condition is failed to be met while the display displays no information, and
set the detection mode to the first detection mode when a predetermined condition is met while the display displays no information, wherein the predetermined condition being met corresponds to a likelihood that the user is not currently using the electronic apparatus, wherein the predetermined condition includes a condition that a current time belongs to a predetermined time frame.

* * * * *